United States Patent

Yoshitake et al.

[11] Patent Number: 5,991,078
[45] Date of Patent: Nov. 23, 1999

[54] DISPLAY MEDIUM EMPLOYING DIFFRACTION GRATING AND METHOD OF PRODUCING DIFFRACTION GRATING ASSEMBLY

[75] Inventors: Shoko Yoshitake; Mitsuo Okabe, both of Tokyo, Japan

[73] Assignee: Dai Nippon Printing Co., Ltd., Tokyo, Japan

[21] Appl. No.: 08/872,498

[22] Filed: Jun. 10, 1997

Related U.S. Application Data

[62] Division of application No. 08/107,380, Aug. 17, 1993, abandoned.

[30] Foreign Application Priority Data

| Aug. 19, 1992 | [JP] | Japan | 4-220022 |
| Aug. 19, 1992 | [JP] | Japan | 4-220074 |
| Aug. 24, 1992 | [JP] | Japan | 4-223966 |

[51] Int. Cl.⁶ ................................. G02B 5/18
[52] U.S. Cl. ................... 359/567; 359/569; 359/22; 428/30; 430/10
[58] Field of Search ........................ 283/86, 90, 91, 283/113; 359/1, 2, 558, 563, 566, 569, 567, 572, 574, 575, 576, 25, 22; 430/10; 428/30

[56] References Cited

U.S. PATENT DOCUMENTS

| 3,515,459 | 6/1970 | Wood | 359/567 |
| 3,861,784 | 1/1975 | Torok | 359/573 |
| 4,033,059 | 7/1977 | Hutton et al. | 40/137 |
| 4,244,633 | 1/1981 | Kellie | 359/25 |
| 4,568,141 | 2/1986 | Antes | 359/2 |
| 4,715,623 | 12/1987 | Roule et al. | 283/91 |
| 4,915,464 | 4/1990 | Hopwood | 359/25 |
| 5,132,812 | 7/1992 | Takahashi et al. | 359/9 |
| 5,291,317 | 3/1994 | Newswanger | 359/15 |
| 5,301,062 | 4/1994 | Takahashi et al. | 359/567 |
| 5,335,113 | 8/1994 | Jackson et al. | 359/569 |
| 5,403,040 | 4/1995 | Mowry, Jr. et al. | 283/91 |

FOREIGN PATENT DOCUMENTS

| 467-601 | 1/1992 | European Pat. Off. | G02B 5/18 |
| 497292 | 8/1992 | European Pat. Off. | G03H 1/26 |
| 2-72320 | 3/1990 | Japan | G02B 27/00 |
| 4-311916 | 11/1992 | Japan | G02B 27/22 |
| 5-2148 | 1/1993 | Japan | G02B 27/22 |

Primary Examiner—Thong Nguyen
Assistant Examiner—John Juba, Jr.
Attorney, Agent, or Firm—Dellett and Walters

[57] ABSTRACT

A display medium employing a diffraction grating to define and represent a display pattern by the contour thereof, which enables the display pattern to move smoothly as the visual point moves and which allows the display pattern to move in various ways and is easy to produce. A display pattern ("DNP"), e.g., a character, an image, etc., is defined and displayed by the outer or inner contour of a diffraction grating (A or B) composed of a group of smooth curves, or a diffraction grating composed of a group of partial straight-line diffraction gratings that form polygonal lines linearly approximating smooth curves. Accordingly, as the visual point is moved relative to the display medium, a position that looks bright by diffraction moves smoothly and variously. If the display medium is illuminated by white light, the region that looks bright becomes a rainbow-colored region. Accordingly, the display pattern becomes not only readily recognizable but also interesting to view. Thus, display and design effects become extremely excellent. By varying the configuration of curves, the motion of the region that looks bright can be changed variously. Also disclosed is a method of producing a diffraction grating assembly for the display medium.

9 Claims, 12 Drawing Sheets

A'

A1 A2 A3 A4 A5 A6 A7

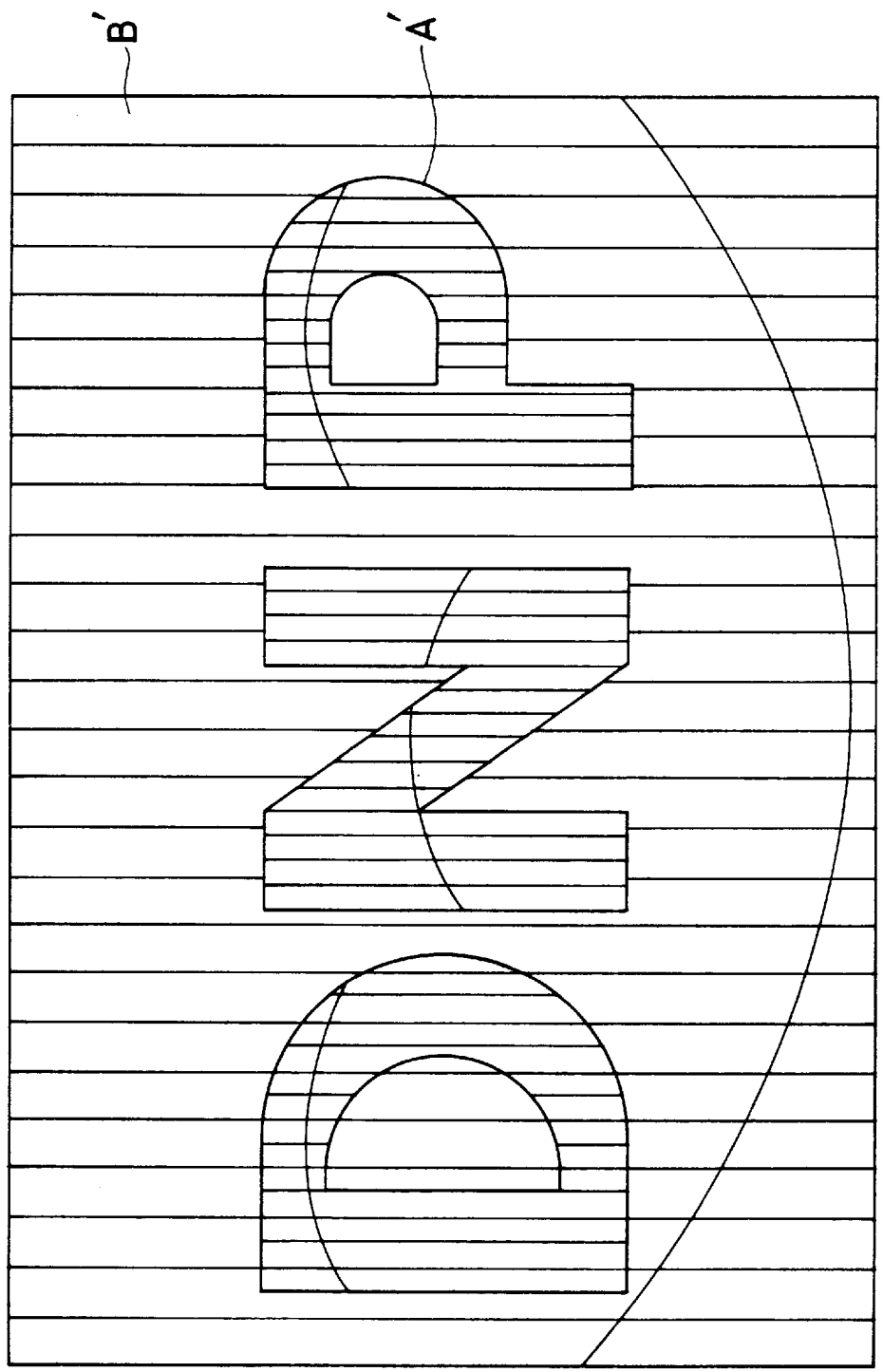

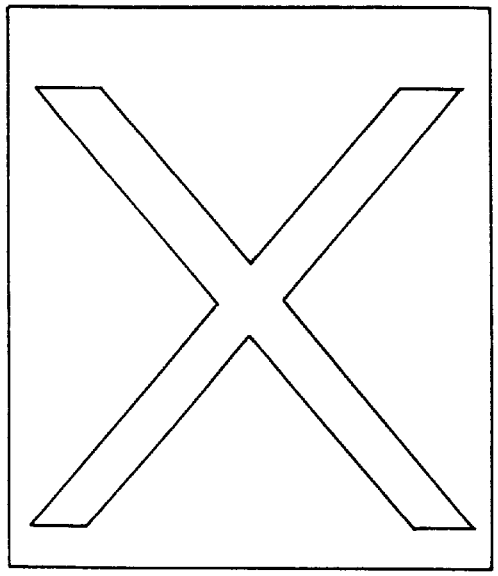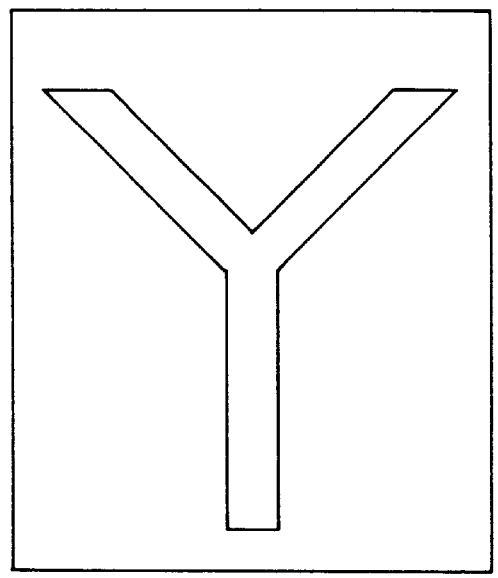
FIG.6(a)      FIG.6(b)
FIG.7(a)      FIG.7(b)

FIG. 8

| X | Y | X | Y | X | Y |
|---|---|---|---|---|---|
| Y | X | Y | X | Y | X |
| X | Y | X | Y | X | Y |
| Y | X | Y | X | Y | X |
| X | Y | X | Y | X | Y |
| Y | X | Y | X | Y | X |
| X | Y | X | Y | X | Y |

B1 B2 B3 B4 B5 B6 B7

M1　M2　M3　M4　M5　M6　M7

DISPLAY MEDIUM EMPLOYING DIFFRACTION GRATING AND METHOD OF PRODUCING DIFFRACTION GRATING ASSEMBLY

This application is a divisional of application Ser. No. 08/107,380, filed Aug. 17, 1993, abandoned.

BACKGROUND OF THE INVENTION

The present invention relates to a display medium which may be provided on a card, a label, a seal, etc. More particularly, the present invention relates to a display medium employing a diffraction grating to define a display pattern, e.g., a character, an image, etc., by the contour thereof, thereby enabling such a display pattern to move as the visual point moves. The present invention also relates to a method of producing a diffraction grating assembly for the display medium.

A technique of forming a display pattern, e.g., a character, an image, etc., by the contour of a diffraction grating has heretofore been known, for example, as a transparent diffraction grating label proposed by the present applicant in U.S. Pat. No. 5,184,848. However, such conventional technique cannot enable a display pattern, e.g., a character, an image, etc., to move as the observer moves the visual point because the display pattern is displayed by the contour of a simple diffraction grating.

On the other hand, Japanese Patent Application Laid-Open (KOKAI) No. 2-72320 proposes a display medium comprising two-dimensionally arranged minute dots, which are respectively made of diffraction gratings, wherein the diffraction gratings of the dots are varied in direction and pitch so that the display pattern changes according to the viewing direction. In this display medium, however, the display pattern is not defined by the contour of a diffraction grating, and the change occurring in the display pattern as the visual point moves is not smooth. Moreover, it is not easy to produce the display medium because a single display pattern is formed by regularly arranging an extremely large number of dots as in the case of halftone dots.

SUMMARY OF THE INVENTION

In view of the above-described circumstances, it is an object of the present invention to provide a display medium employing a diffraction grating to define and represent a display pattern by the contour thereof, which enables the display pattern to move smoothly as the visual point moves and which allows the display pattern to move in various ways and is easy to produce, together with a method of producing a diffraction grating assembly for the display medium.

To attain the above-described object, the present invention provides a display medium employing a diffraction grating to define and display a display pattern, for example, a character, an image, etc., by the outer or inner contour thereof, wherein the diffraction grating is composed of a group of smooth curves.

The display medium may include a plurality of diffraction gratings respectively composed of different groups of curves so that the diffraction gratings display respective display patterns.

In addition, the present invention provides a display medium employing a diffraction grating to define and display a display pattern, for example, a character, an image, etc., by the outer or inner contour thereof, wherein the diffraction grating is composed of a group of partial straight-line diffraction gratings disposed in side-by-side relation to each other to correspond to subdivided regions of the diffraction grating. The partial straight-line diffraction gratings are arranged such that each pair of adjacent partial straight-line diffraction gratings have therebetween a gradual and smooth change in grating slope and a smooth or substantially no change in grating pitch and that when grating lines or straight lines parallel to them are connected together between a pair of adjacent partial straight-line diffraction gratings, the connected lines form polygonal lines linearly approximating smooth curves.

In this case also, the display medium may include a plurality of diffraction gratings respectively composed of groups of partial straight-line diffraction gratings which form polygonal lines linearly approximating different smooth curves so that the diffraction gratings display respective display patterns.

In addition, the present invention provides a multiple display medium including a plurality of display patterns each composed of a diffraction grating assembly. Each display pattern is divided into fine mesh pixels disposed at predetermined intervals, and the divided mesh pixels are selected at predetermined intervals either two- or one-dimensionally to form a single display pattern such that it is filled with the selected mesh pixels of all the display patterns without excess nor deficiency, with the original relative positions of the pixels being maintained. An oblique-line portion or a detail portion of any one of the display patterns is formed of mesh pixels which are selected and combined together according to a rule different from that for the other portion.

Preferably, the divided pixels are not smaller than 30 μm in size.

In addition, the present invention provides a multiple display medium including a plurality of display patterns each composed of a diffraction grating assembly. Each display pattern is divided into fine mesh pixels disposed at predetermined intervals, and the divided mesh pixels are selected at predetermined intervals either two- or one-dimensionally to form a single display pattern such that it is filled with the selected mesh pixels of all the display patterns without excess nor deficiency, with the original relative positions of the pixels being maintained. At least one display pattern comprises either a diffraction grating assembly composed of a group of smooth curves or a diffraction grating assembly composed of a group of partial straight-line diffraction gratings. The partial straight-line diffraction gratings are arranged such that each pair of adjacent regions, each composed of a pixel or a plurality of pixels, have therebetween a gradual and smooth change in grating slope and a smooth or substantially no change in grating pitch and that when grating lines or straight lines parallel to them are connected together between a pair of adjacent partial straight-line diffraction gratings, the connected lines form polygonal lines linearly approximating smooth curves.

In this case also, the divided pixels are preferably not smaller than 30 μm in size. It is also preferable that an oblique-line portion or a detail portion of any one of the display patterns be formed of mesh pixels which are selected and combined together according to a rule different from that for the other portion.

In addition, the present invention provides a method of producing a diffraction grating assembly forming a display medium in which a display pattern, for example, a character, an image, etc., is divided into small regions, and the divided regions are represented by using straight-line diffraction gratings which are different from each other in at least grating slope or grating pitch for each pair of adjacent regions. In this method, a plurality of masks having openings corresponding to the respective contours of the divided regions are employed, and exposure is successively carried out with the masks successively changed to form straight-line interference fringes by two-beam interference on portions of a photosensitive material corresponding to the respective openings of the masks so that each pair of adjacent portions are different from each other in at least fringe slope or fringe pitch, thereby forming an overall display pattern.

The method may be applied to production of a diffraction grating assembly in which the straight-line interference fringes in the divided regions are formed so that a pair of adjacent divided regions have therebetween a gradual and smooth change in fringe slope and a smooth or substantially no change in fringe pitch and that when the straight-line interference fringes or straight lines parallel to them are connected together between a pair of adjacent divided regions, the connected lines form polygonal lines linearly approximating smooth curves.

In addition, the present invention provides a method of producing a diffraction grating assembly including a plurality of diffraction gratings different from each other in direction or pitch, which are disposed in side-by-side relation to each other. The method comprises the steps of: coating a photosensitive material on a substrate; exposing the whole surface of the photosensitive material coating to form two-beam interference fringes corresponding in direction and pitch to those in a first subregion, thereby producing a first diffraction grating; duplicating the first diffraction grating; coating a photosensitive material on the resulting duplicate as a new substrate; exposing the whole surface of the photosensitive material coating to form two-beam interference fringes corresponding in direction and pitch to those in a second subregion, thereby producing a second diffraction grating; applying light to a region including at least the first subregion, exclusive of the second subregion; carrying out development to separate or remove the photosensitive material from the irradiated region, thereby producing a diffraction grating structure having the first diffraction grating formed in at least the first subregion and the second diffraction grating formed in the second subregion; duplicating the diffraction grating structure; and repeating a similar process to the above for a third subregion and so forth, thereby producing a diffraction grating assembly having a predetermined diffraction grating formed in each subregion.

Preferably, the photosensitive material enables a desired pattern to be recorded as a relief pattern according to irradiation dose of light and can be decomposed or made soluble by irradiation with ultraviolet rays, for example.

The method may be applied to production of a diffraction grating assembly in which the diffraction gratings in the subregions of the diffraction grating assembly are arranged such that each pair of adjacent subregions have therebetween a gradual and smooth change in grating slope and a smooth or substantially no change in grating pitch and that when grating lines or straight lines parallel to them are connected together between a pair of adjacent subregions, the connected lines form polygonal lines linearly approximating smooth curves, and in which each subregion defines and displays a display pattern, for example, a character, an image, etc., by the outer or inner contour thereof.

According to the display medium of the present invention, a display pattern, e.g., a character, an image, etc., is defined and displayed by the outer or inner contour of a diffraction grating composed of a group of smooth curves, or a diffraction grating composed of a group of partial straight-line diffraction gratings that form polygonal lines linearly approximating smooth curves. Accordingly, as the visual point is moved relative to the display medium, a position that looks bright by diffraction moves smoothly and variously. If the display medium is illuminated by white light, the region that looks bright becomes a rainbow-colored region. Accordingly, the display pattern becomes not only readily recognizable but also interesting to view. Thus, display and design effects become extremely excellent. By varying the configuration of curves, the motion of the region that looks bright can be changed variously.

According to the first method of producing a diffraction grating assembly according to the present invention, a plurality of masks having openings corresponding to the respective contours of the divided regions are employed, and exposure is successively carried out with the masks successively changed to form straight-line interference fringes by two-beam interference on portions of a photosensitive material corresponding to the respective openings of the masks so that each pair of adjacent portions are different from each other in at least fringe slope or fringe pitch, thereby forming an overall display pattern. Accordingly, a diffraction grating display medium, which has a relatively wide area and which enables the display pattern to move in various ways as the visual point moves, can readily be produced by optical process.

According to the second method of producing a diffraction grating assembly according to the present invention, a diffraction grating assembly having a predetermined diffraction grating formed in each subregion is produced by repeating the following steps: coating of a photosensitive material; formation of two-beam interference fringes on the whole surface of the photosensitive material coating by exposure; duplicating; coating of a photosensitive material; formation of two-beam interference fringes on the whole surface of the photosensitive material coating by exposure; and irradiation with light to expose the diffraction grating underlying a predetermined portion of the photosensitive material. Accordingly, even if there is a failure in photographing for a subregion, the processes which have already been carried out so far are not wasted. Even if there is a positioning error, the finished product is free from such a defect that a region where no grating is present or two gratings overlap each other is undesirably produced between partial diffraction gratings of the diffraction grating assembly. Thus, it is possible to readily produce a high-quality diffraction grating assembly which may be used, for example, to form the above-described display medium.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 5 shows one example in which the display medium shown in FIG. 3 is represented by a diffraction grating assembly comprising partial straight-line diffraction gratings.

FIGS. 6(a) and 6(b) show two display patterns to be multiplexed according to the present invention.

FIGS. 7(a) and 7(b) show mesh pixels selected for multiplexing.

FIG. 8 shows mesh pixels in a multiplexed display pattern.

DESCRIPTION OF THE PREFERRED EMBODIMENTS

The principle of the display medium employing a diffraction grating according to the present invention will be described below with reference to the accompanying drawings, together with some embodiments thereof and a method of producing a diffraction grating assembly used for the display medium.

Figure 1A:
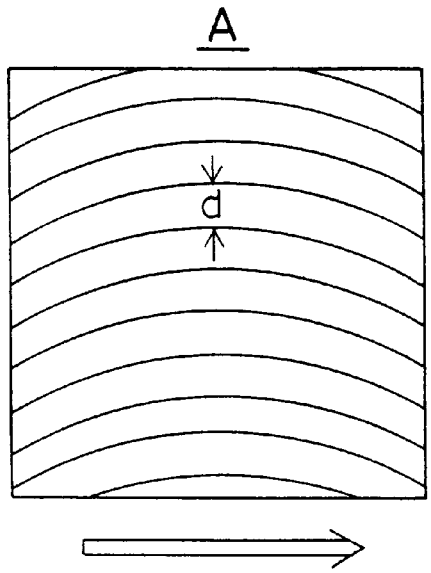
FIGS. 1(*a*) and 1(*b*) are plan views of a diffraction grating composed of a group of curves on which the present invention is based, showing the way in which a region that looks bright moves as the visual point moves.
Figure 1B:
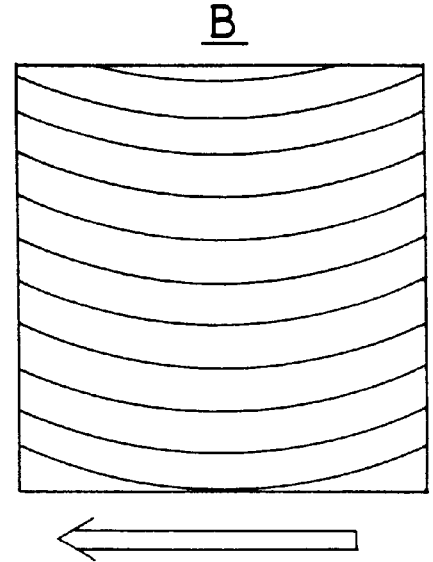

Let us examine a reflecting diffraction grating A composed of a group of upward convex curves disposed at a predetermined pitch d, as shown in the plan view of FIG. 1(a). In a case where a light source emits light from above this side of the plane of the figure, if the visual point is moved from the left to the right, a region that looks bright on the grating surface moves from the left to the right in the same direction as the direction of movement of the visual point. The movement is shown by the arrow put at the lower side (as viewed in the figure) of the grating surface. If the visual point is moved reversely, the region that looks bright moves in the opposite direction to the arrow direction. In the case of a light source that emits white light, the region that looks bright is a band-shaped region which is rainbow-colored in the vertical direction as viewed in the figure. The larger the curvature radius of the curves constituting the diffraction grating, the higher the speed of movement of the bright region. As for a diffraction grating B composed of a group of downward convex curves, which is in upside-down relation to the diffraction grating A, as shown in FIG. 1(b), if the visual point is moved from the left to the right, the bright region moves from the right to the left in the opposite direction to the direction of movement of the visual point in the reverse relation to the diffraction grating A shown in FIG. 1(a).

Figure 2A:
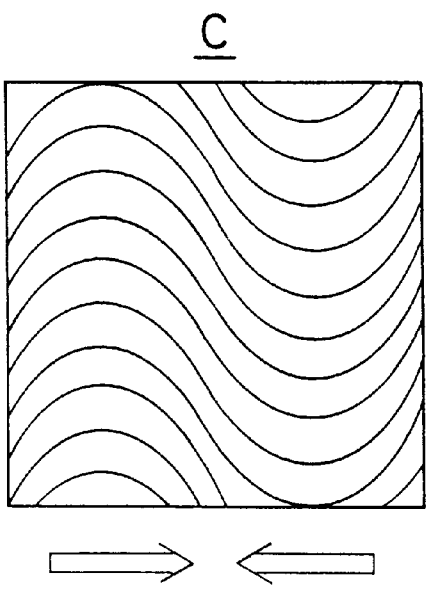
FIGS. 2(*a*) and 2(*b*) are views for explanation of motion in the case of a diffraction grating composed of a group of wavy lines.
Figure 2B:
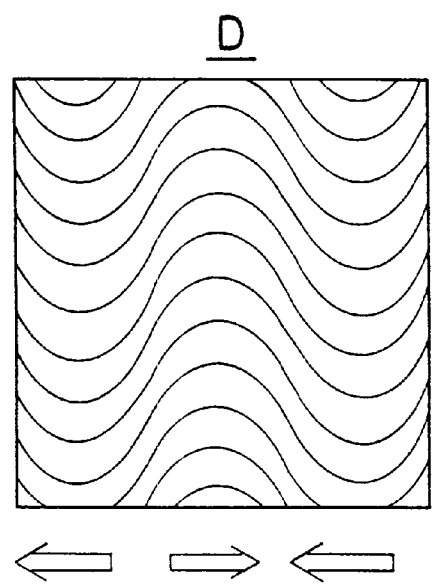

Diffraction gratings which are respectively composed of upward convex curves and downward convex curves, as described above, may be combined together to form diffraction gratings C and D composed of wavy lines, for example, as shown in FIGS. 2(a) and 2(b). If the visual point is moved on the diffraction gratings C and D with a light source disposed in the same way as the above, a region that looks bright on each grating surface moves as indicated by the arrows. Accordingly, if such diffraction gratings C and D are observed with the visual point being moved, the region that looks bright also moves in the same direction or in the opposite direction, and this region shines in rainbow color. Accordingly, remarkable display and design effects are obtained.

In the diffraction gratings composed of curved lines as described above, if the grating pitch d is locally varied, the area and direction of movement of the region that looks bright are further diversified, and the display and design effects become even more remarkable.

Figure 3:
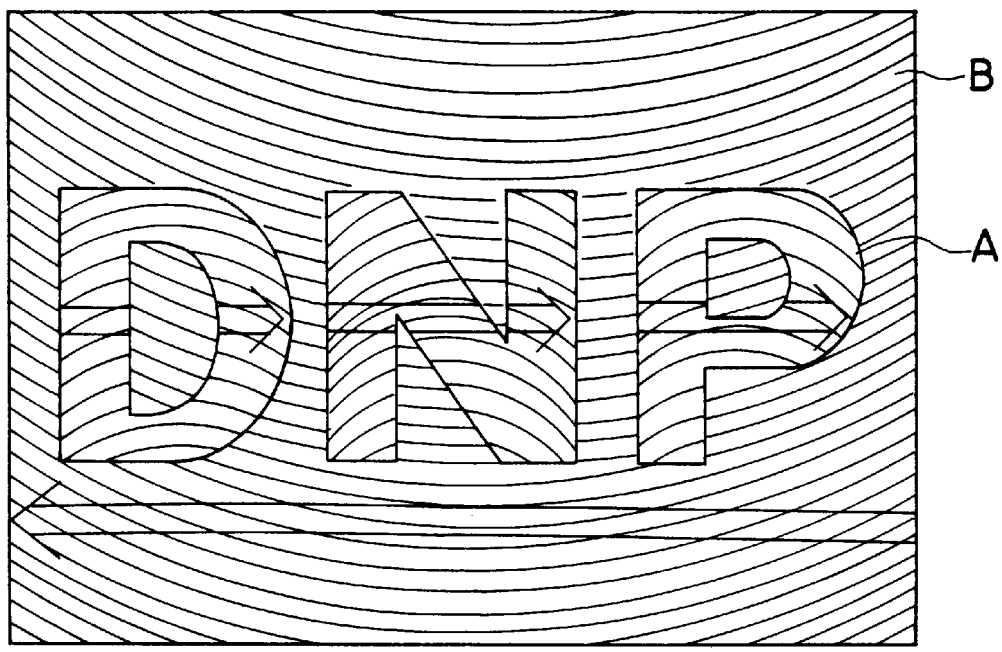
FIG. 3 is a plan view of a display medium according to one embodiment of the present invention.

Let us represent a display pattern, e.g., a character, an image, etc., by the contour of a diffraction grating composed of a group of smooth curves as described above. One example is shown in FIG. 3. In this example, a character string "DNP" is displayed against a background. For each character, a diffraction grating A (see FIG. 1(a)), which is composed of a group of upward convex curves having a relatively small curvature radius, is used by cutting it out in the form of the character "D", "N" or "P". For the background, a diffraction grating B (see FIG. 1(b)), which is composed of a group of downward convex curves having a relatively large curvature radius, is used with the character area "DNP" cut out. Then, the two different kinds of diffraction grating are combined together as shown in FIG. 3 to form a display pattern structure. In a case where a light source emits light from above this side of the plane of the figure, if the visual point is moved from the left to the right, in the character area "DNP" a region that looks bright moves in the same direction as the direction of movement of the visual point at relatively low speed, thus enabling the character string "DNP" to be recognized. In contrast, in the background a region that looks bright moves in the opposite direction to the direction of movement of the visual point at relatively high speed. Thus, combination of the movement of the bright region in the character area "DNP" with that of the bright region in the background provides excellent display and design effects.

It should be noted that in the arrangement shown in FIG. 3 one diffraction grating that constitutes either the character area or the background may be omitted so that the character string "DNP" is represented by the other diffraction grating alone. Diffraction gratings composed of wavy lines as shown in FIG. 2 may be employed as the diffraction gratings A and B. It is also possible to employ diffraction gratings in which the grating pitch is locally varied.

Incidentally, the above-described diffraction gratings composed of curved lines can be produced by writing desired curved lines at a predetermined pitch on a resist coated on a substrate by an electron beam lithography system, an ion beam lithography system, or a laser lithography system. In such a case, diffraction gratings are successively drawn at a desired pitch and a desired slope, for example, by controlling the movement of an x-y-⊖ stage supporting the substrate under the control of a computer. The resist with the desired curved lines written thereon is developed, and the resulting relief is duplicated to produce a die. Then, the die is embossed into a resin film. In this way, a large number of display media can be produced by duplicating process. To produce a reflecting or semitransparent display medium, a reflecting layer or a semitransparent layer is formed on the relief surface by depositing thereon a metal or a thin film of different refractive index by evaporation or other similar process.

Even if such a lithography system is employed, it takes a great deal of time and cost to lithographically produce all the curved lines of a diffraction grating having a relatively wide area. If a diffraction grating can be formed of straight lines, it can be produced with ease by two-beam interference, for example. Therefore, it is extremely desirable for the diffraction grating to be composed of straight lines.

Figure 4:
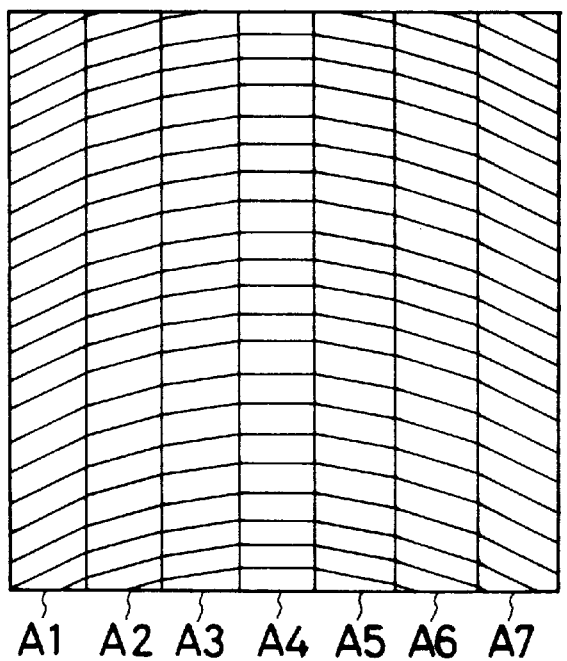
FIG. 4 is a view for explanation of the principle of approximately forming a diffraction grating composed of curves by partial diffraction gratings composed of straight lines.

So let us approximately form a diffraction grating composed of curved lines, such as those described above, from partial diffraction gratings composed of straight lines. FIG. 4 shows one example in which the diffraction grating A, shown in FIG. 1(a), is formed from partial diffraction gratings A1 to A7. In this arrangement, the diffraction grating A is divided into portions as unities in each of which the grating lines have the same slope and the same pitch, and the divided portions are replaced by respective straight-line diffraction gratings A1 to A7 each having the same slope and pitch as those of the corresponding portion. Accordingly, the partial diffraction gratings A1 to A7 each comprise a straight-line diffraction grating, and the slope and pitch of the grating lines smoothly change between each pair of adjacent partial diffraction gratings and do not rapidly change to a large extent in any region of the original diffraction grating A. In the diffraction grating assembly A', which is composed of a group of contiguous partial straight-line diffraction gratings and in which the slope and pitch of the lines constituting each partial straight-line diffraction grating gradually and smoothly change between the adjacent partial straight-line diffraction gratings (the pitch may be left unchanged) and do not rapidly change to a large extent, a region that looks bright also smoothly moves as the visual point moves, in the same way as in the case of the diffraction grating A, shown in FIG. 1(a). The smaller the area of each divided portion, the smoother the movement of the bright region. A similar arrangement can also be made for the diffraction gratings shown in FIGS. 1(b), 2(a) and 2(b). It should be noted that the configurations of the divided portions are determined by the configuration and distribution of the original curved lines, and that both the diffraction gratings shown in FIGS. 1(a), (b), 2(a) and 2(b) are divided into stripe regions vertically extending in side-by-side relation to each other, as shown in FIG. 4. It should also be noted that the widths of the stripe regions need not always be equal to each other.

FIG. 5 shows one example in which the character area "DNP" and the background of the display medium shown in FIG. 3 are formed by using diffraction grating assemblies each comprising partial straight-line diffraction gratings. In the figure, the direction of the diffraction grating provided in each region is indicated by the circular arc. Both the diffraction grating assemblies A' and B' are divided into stripe regions vertically extending in side-by-side relation to each other. In the diffraction grating assembly A', the slope of the grating lines in the divided regions successively changes 5° at a time, i.e., 30°, 25°, . . . , 10°, 5°, 0°, −5°, −10°, . . . , −25°, and −30° from the left to the right. In the diffraction grating assembly B', the grating slope successively changes 3° at a time, i.e., −39°, −36°, . . . , −6°, −3°, 0°, 3°, 6°, . . . , 36°, and 39° from the left to the right. As for the grating pitch, the same pitch is employed in each of the divided regions in the diffraction grating assembly A'. In the divided regions of the diffraction grating assembly B' also, the same grating pitch is employed. In this case also, a region that looks bright smoothly moves as the visual point moves, in the same way as in the case of FIG. 3. In addition, diffracted light looks bright because the region of each partial diffraction grating which produces diffracted light in a predetermined direction and of a predetermined color has some area.

Incidentally, display patterns such as those shown in FIGS. 3 and 5 are single display patterns, in which when the position of the light source or the visual point, for example, is moved, only a region that looks bright moves, but the display patterns themselves do not change. Now, a method of providing a multiplexed display will be explained. A multiplexing method has already been proposed in U.S. Pat. No. 5,032,003, in which display patterns comprise simple straight-line diffraction gratings, and each display pattern is composed of a group of finely divided diffraction grating pixels in order to make the display pattern vary according to the viewing direction. Further, in the proposed multiplexing method, diffraction grating pixels that constitute a plurality of display patterns are arranged side by side at predetermined intervals in order to multiplex the plurality of display patterns. Such a multiplexing method can also be applied to the display medium employing a diffraction grating according to the present invention. A display medium multiplexed in this way will be explained below.

Let us consider an example of multiplexing two display patterns each comprising diffraction gratings composed of curved lines, as shown in FIG. 3, or an assembly of such diffraction gratings, or multiplexing two display patterns each comprising a diffraction grating assembly comprising partial straight-line diffraction gratings, as shown in FIG. 5. FIGS. 6(a) and 6(b) show examples of such display patterns. First, each display pattern is divided into fine mesh pixels. Preferable mesh patterns are a regular triangle, a square, a regular hexagon, etc. because with these patterns no dead regions are produced. Next, the divided mesh pixels are alternately selected in both the vertical and horizontal directions. FIGS. 7(a) and 7(b) respectively show two groups of mesh pixels selected from the display patterns shown in FIGS. 6(a) and 6(b). In this example, pixels, which are formed in square mesh patterns, are selected in the form of checkered patterns, shown by X and Y. The selected pixels X and Y are superimposed so that the pixels X and Y alternate with each other in both the vertical and horizontal directions with their original positions maintained, as shown in FIG. 8.

With the thus multiplexed display medium, displayed patterns are changed over from one to the other according to the viewing direction and the position of the light source. If the visual point is moved relative to the display medium, a region of the same display pattern which looks bright by diffraction moves smoothly and variously. If the display medium is illuminated by white light, the region that looks bright becomes a rainbow-colored region.

The foregoing is a description of an example of multiplexing two single display patterns as shown in FIG. 3 or 5. However, it is also possible to multiplex three or more display patterns such as those described above. In such a case, the mesh pixels of each display pattern are selected at predetermined intervals in both the vertical and horizontal directions or either of the two directions so that the resulting multiplexed display pattern is filled with the mesh pixels of all the display patterns without excess nor deficiency.

Furthermore, all the display patterns of diffraction gratings which are to be multiplexed need not always be motional display patterns formed from diffraction gratings of curved lines or from straight-line diffraction gratings combined to approximate them, which are based on the present invention. A part of them may be a motionless display pattern formed from a simple straight-line diffraction grating such as that employed in U.S. Pat. No. 5,032,003. If a diffraction grating is formed as a hologram capable of displaying a three-dimensional image, the diffraction grating, which is originally planar, gives the impression of depth and hence looks cubic relatively. In these cases also, the display patterns are each divided into fine mesh pixels disposed at predetermined intervals, and the respective mesh pixels of the display patterns are selected at predetermined intervals and combined together, in the same way as the above.

Incidentally, some methods may be conceived to allow a particular display pattern in those multiplexed together to be noticeable relative to the others. The first method is to form a display pattern desired to become relatively noticeable so that the occupying area or density thereof is relatively large or high. For example, when two display patterns are to be multiplexed, the mesh pixels of the display patterns are not alternately selected in both the vertical and horizontal directions, as described above, but combined by repeating, for example, such a selection and combination rule that two consecutive pixels of one display pattern are first selected, then one pixel of the other display pattern is selected, and then two consecutive pixels of the first display pattern are selected. By doing so, the two display patterns are multiplexed at an area ratio of 2:1. Thus, the first display pattern becomes more noticeable than the other. The second method is to multiplex display patterns in such a manner that a display pattern which is desired to become noticeable is formed by using a motional display pattern formed from a diffraction grating composed of curved lines or from straight-line diffraction gratings combined to approximate it, which are based on the present invention, and to form a display pattern which is to become relatively inconspicuous by using a motionless display pattern composed of simple straight-line diffraction gratings. The third method is to multiplex display patterns so that a display pattern which is desired to become noticeable has a relatively wide angle of diffraction, while a display pattern which is to become relatively inconspicuous has a relatively narrow angle of diffraction. Since a motional display pattern that is formed from a diffraction grating composed of curved lines or from straight-line diffraction gratings combined to approximate it, which are based on the present invention, has a relatively wide angle of diffraction, the above-described second method may be considered to be one that belongs to the third method. However, the present invention is not necessarily limited thereto. For example, if a diffraction grating display pattern which is desired to become relatively noticeable is formed from a group of fine mesh pixels whose diffraction angles and directions are distributed at random in a predetermined range, the resulting display pattern becomes relatively noticeable.

Figure 9:
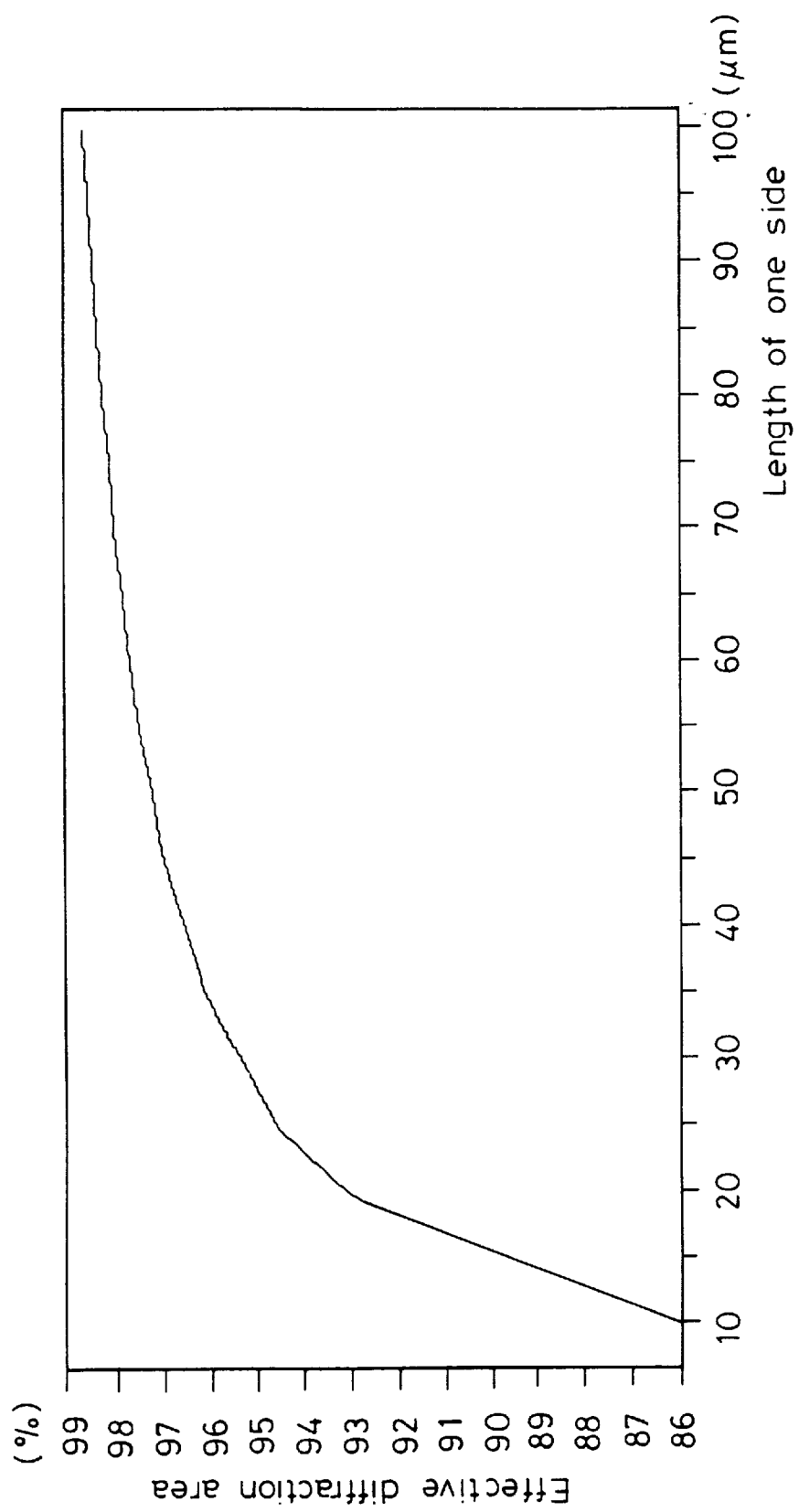
FIG. 9 is a graph showing the results of measurement of the effective diffraction area relative to the length of one side of square pixels.

Although no mention has particularly been made of the size of fine mesh pixels obtained by dividing display patterns in the above-described way of multiplexing, it has been found that if the size of the mesh pixels is excessively small, the diffraction efficiency lowers and hence the display pattern becomes dark. FIG. 9 is a graph showing the results of measurement of the effective diffraction area (corresponding to the diffraction efficiency) relative to the length of one side of square pixels formed by diagonally ruling a straight-line diffraction grating having a grating pitch of 1 $\mu$m. As will be clear from the graph, when the pixel size becomes less than about 30 $\mu$m, the diffraction efficiency rapidly lowers. The reason for this is attributable to the reduction in the number of effective diffraction grating lines in the vicinity of each vertex of the polygon. It will be understood from the results that the effective size of fine mesh pixels obtained by dividing display patterns is not smaller than 30 $\mu$m.

Figure 10A:
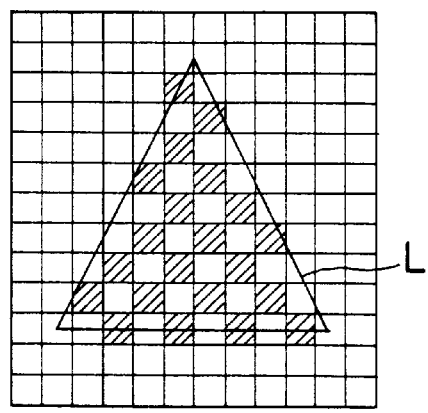
FIGS. 10(a) and 10(b) are views for explanation of a method of changing pixels at a contour portion of a display pattern.
Figure 10B:
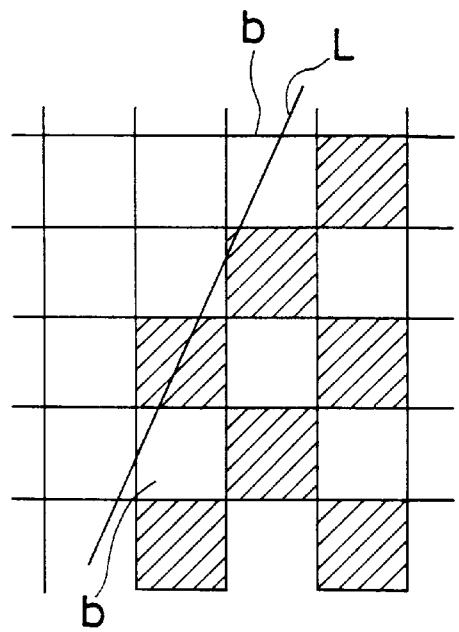

Since there is a lower limit to the size of mesh pixels in multiplexing, serrated patterns may appear on an oblique-line portion or a detail portion of a display pattern. An effective way of coping with this problem is to change the mesh pixel selection and combination rule at an oblique-line portion or a detail portion of the display pattern. FIG. 10(*a*) shows superimposition of one display pattern representing a triangle L upon another display pattern representing a figure or a character. Pixels of the display pattern representing the triangle L are selected so as to define the contour of the triangle L, as shown by the hatched lines. As will be clear from overall observation of the hatched portions in the figure, the oblique contour of the original triangle L is serrated, so that it is difficult for the pattern to look to be a triangle. Therefore, as shown in FIG. 10(*b*), which is an enlarged view of an oblique-line portion of the triangle L, pixels b, which are among non-hatched pixels that originally represent another display pattern and in which the area (area occupation ratio) occupied by the triangle L as a display pattern to be superimposed thereon is 50% or more, are changed to pixels of the display pattern representing the triangle L. However, if a pixel b includes a characteristic portion of the other display pattern, e.g., the contour or detail portion thereof, such replacement is not conducted because if the pixel b is changed, the contour or other characteristic portion of the other display pattern becomes difficult to recognize.

Figure 11:
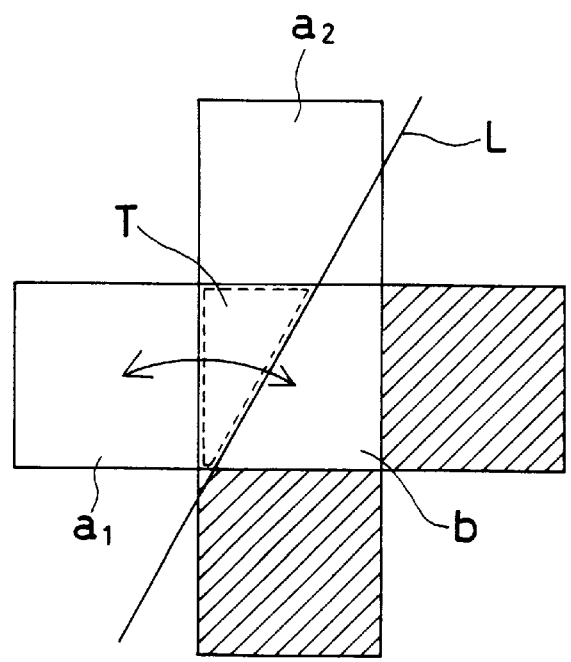
FIG. 11 is a view for explanation of a pixel which is additionally changed in accordance with the pixel change effected by the method shown in FIGS. 10(a) and 10(b).

Incidentally, if a pixel b at the contour or detail portion of one display pattern, where the area occupation ratio exceeds 50% and where a pixel of the other image pattern should be selected according to the proper pixel selection and combination rule, is changed to a pixel (hatched pixel) of the first display pattern, the density of pixels of this display pattern (triangle L) becomes relatively high at that portion, whereas the density of pixels of the second display pattern lowers. Therefore, as shown in FIG. 11, a pixel $a_1$ or $a_2$, which is adjacent to a pixel b and which should originally belong to the display pattern representing the triangle L, is selected and changed to a non-hatched pixel representing the background. The selection technique is as follows. The pixel $a_1$, which is contacted by the longest side of a polygon T (shown by the chain line) defined outside the triangle L by the contour line L extending through the pixel b, is selected and changed from the original hatched pixel representing the triangle L to a non-hatched pixel representing the background.

Another effective way of preventing occurrence of a serrated pattern at an oblique-line portion or a detail portion of a display pattern in multiplexing is to subdivide the mesh pixels in such a portion and to apply a similar multiplexing method to the subdivided mesh pixels instead of changing the mesh pixel selection and combination rule as described above.

In the foregoing description of multiplexing, all the display patterns to be multiplexed need not always be the whole display patterns such as those shown in FIGS. 6(a) and 6(b). For example, multiplexing may be effected as follows. Only the character area of the character string "DNP" shown in FIG. 3 or 5 is cut out. Then, the cutout portion is divided into mesh pixels, and these pixels are then selected according to a predetermined rule in the same way as the above. In the meantime, only that portion of another display pattern which corresponds to the character area "DNP" is similarly divided into mesh pixels, and these pixels are selected according to a predetermined rule. Thus, the two display patterns are multiplexed only at the character area. In this case also, the above-described serrated pattern preventing method can effectively be applied to the cutout contour portion. In this case, the portion of the second display pattern other than the portion corresponding to the character area "DNP" may be either a uniform display pattern, which is not divided into mesh pixels, or a display pattern composed of finely divided mesh pixels, which are selected according to a predetermined rule, in order to match the brightness with that of the multiplexed portion.

The following is a description of a method of producing the above-described display medium that is formed from a diffraction grating composed of curved lines, and the display medium that is formed from a diffraction grating assembly in which such a diffraction grating is approximated by groups of straight lines, and further the display medium that is formed by multiplexing these diffraction grating display patterns. These display media can be produced by writing desired curved lines at a predetermined pitch on a resist coated on a substrate by an electron beam lithography system, an ion beam lithography system, or a laser lithography system. In such a case, diffraction gratings are successively drawn at a desired pitch and a desired slope, for example, by controlling the movement of an x-y-$\ominus$ stage supporting the substrate under the control of a computer, as described above. The resist with the desired curved lines written thereon is developed, and the resulting relief is duplicated to produce a die. Then, the die is embossed into a resin film. In this way, a large number of display media can be produced by duplicating process. To produce a reflecting or semitransparent display medium, a reflecting layer or a semitransparent layer is formed on the relief surface by depositing thereon a metal or a thin film of different refractive index by evaporation or other similar process.

Figure 12:
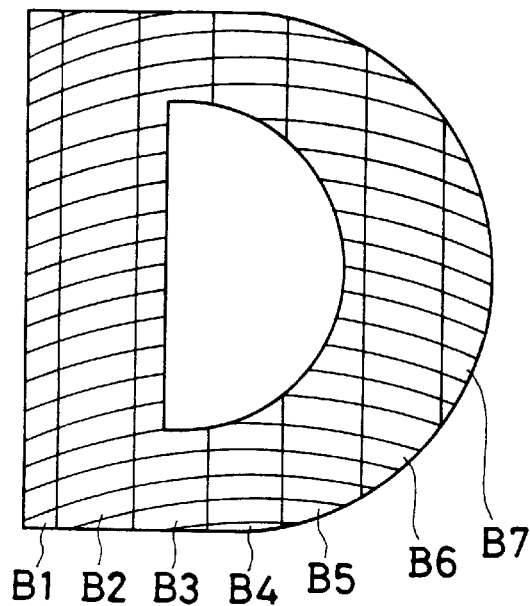
FIG. 12 shows one example of a simple display medium comprising a group of straight-line diffraction gratings.
Figure 13:
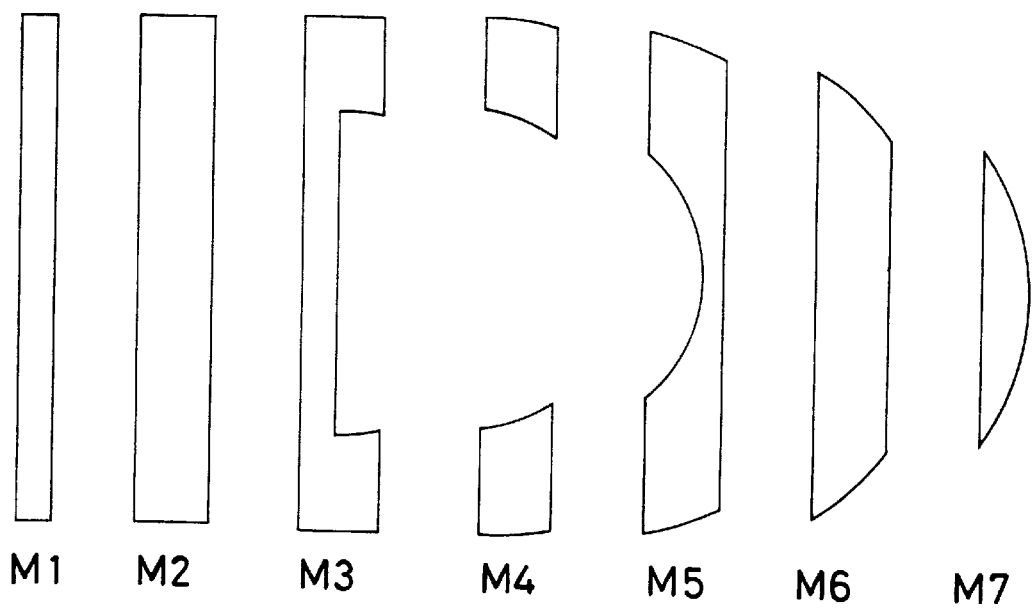
FIG. 13 shows the opening configurations of masks used when the display medium shown in FIG. 12 is produced by the first producing method of the present invention.
Figure 14:
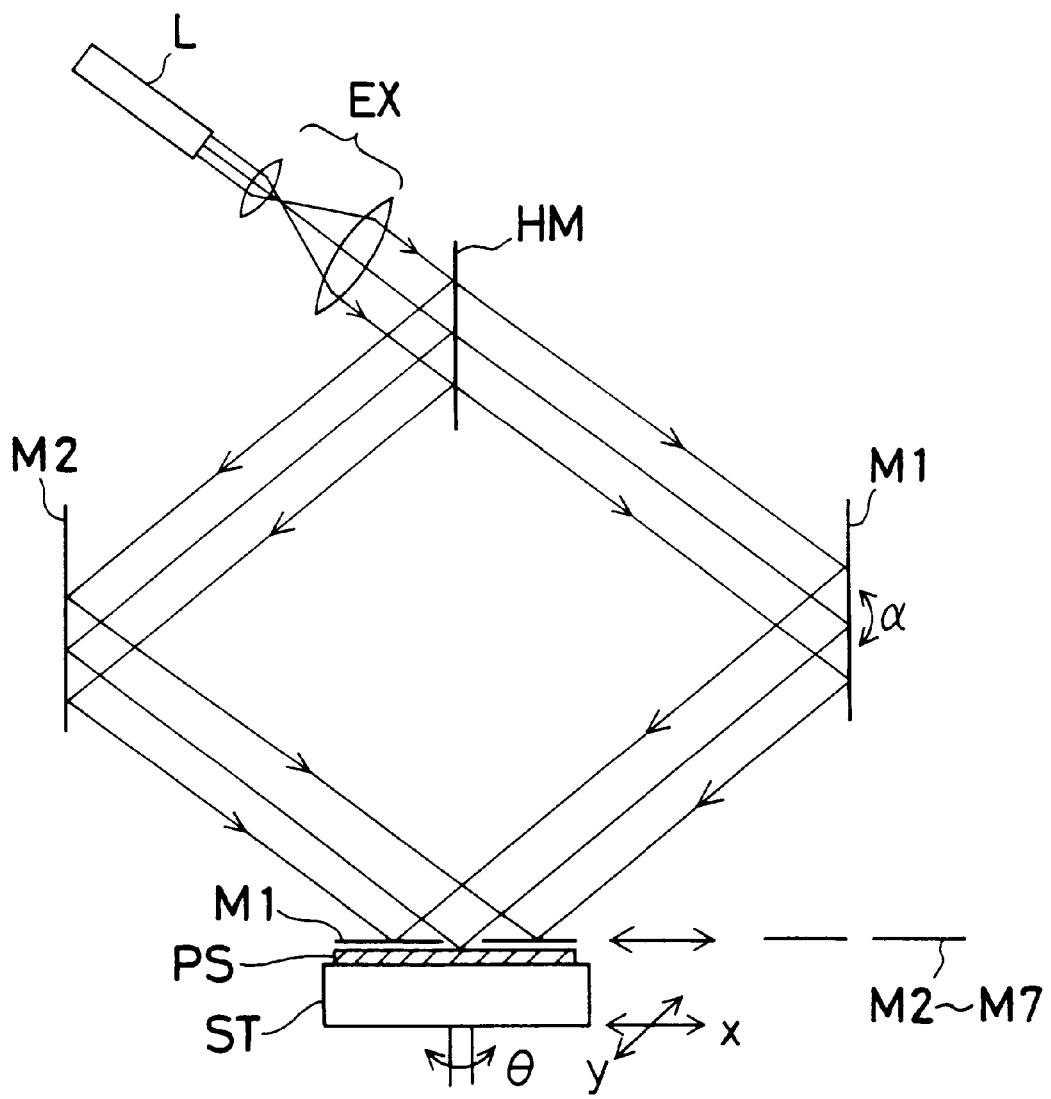
FIG. 14 shows one example of an optical arrangement for carrying out the first producing method.

A display pattern structure such as that shown in FIGS. 4 and 5 can readily be produced by an optical method as follows. A photosensitive plate is masked with a first mask that represents one united character or image region (the character "D" or the like or the background in the case of the illustrated example), and a second mask that defines stripe regions is superimposed thereon. The second mask is sequentially moved relative to the photosensitive plate and the first mask in a step-and-repeat manner, and exposure is carried out at each move position by making two beams interfere with each other so that interference fringes are produced with the pitch and direction of the grating lines at that position. It is also possible to employ a method wherein only a set of masks having the respective outer shapes of divided regions are used, and these masks are changed for each divided area to produce interference fringes for the region by exposure. This producing method will be explained below with reference to FIGS. 12 to 15A and 15B. Let us express the character "D" by dividing only the inner region of the character "D" as shown in FIG. 12 and by using the diffraction grating assembly A', which comprises straight-line diffraction gratings as shown in FIG. 4. The divided regions are assumed to be B1 to B7, as illustrated in FIG. 12. As shown in FIG. 13, seven masks M1 to M7 having openings corresponding to the respective contours of the divided regions are prepared, and with the masks successively changed, two-beam interference fringes are successively produced on a single photosensitive plate by exposure. For this process, an optical arrangement such as that shown in FIG. 14 may be employed. That is, a photosensitive plate PS is placed on a stage ST which enables position adjustment in x-y directions along the plane of the stage ST and which also enables the angle $\ominus$ to be adjusted around an axis perpendicular to the stage plane. Then, the above-described masks M1 to M7 are successively selected and positioned on the photosensitive plate PS. Meantime, light from a laser light source L is passed through a beam expander EX, thereby enlarging the cross-section of the laser light. The resulting parallel beam enters a half-mirror HM, thereby being split into two beams traveling in respective directions. One beam is reflected by a mirror M1, while the other beam is reflected by a mirror M2, so that the reflected beams interfere with each other on the stage ST. Accordingly, interference fringes are formed by exposure on the photosensitive plate PS through the opening region of each of the masks M1 to M7 selected successively. In order to obtain a desired direction and pitch of interference fringes in each of the regions B1 to B7 as shown in FIG. 12, every time the masks M1 to M7 are changed, the stage ST is rotated to adjust the direction of interference fringes, and the interference fringe pitch is adjusted by varying the angle $\alpha$ of the mirror M1, for example. In this way, a display medium such as that shown in FIGS. 6(a) and 6(b) is produced.

Incidentally, when a diffraction grating assembly such as that shown in FIGS. 4, 5 and 12 is optically produced by carrying out two-beam interference exposure for only one divided region at a time while changing a plurality of masks prepared for a single photosensitive plate, as described above, if there is a failure in photographing through one mask, all the processes which have already been executed so far may be wasted. If there is an error in positioning of one of the masks, a region where no grating is present or two gratings overlap each other is undesirably produced between partial diffraction gratings of the finished diffraction grating assembly, resulting in an unattractive product.

To cope with such problems, interference fringes in each region are formed by exposure without using a mask. That is, a substrate is coated with a photosensitive material, and the whole surface of the coating is exposed to form two-beam interference fringes having the same direction and pitch as those in the first subregion, thereby producing a first diffraction grating. Next, this diffraction grating is duplicated. With the duplicate plate used as a new substrate, the photosensitive material is coated thereon, and the whole surface of the coating is exposed to form two-beam interference fringes having the same direction and pitch as those in the second subregion, thereby producing a second diffraction grating. Thereafter, with a mask brought into close contact with the substrate, ultraviolet rays or the like are applied to a region including at least the first subregion, exclusive of the second subregion, and development is carried out to separate or remove the photosensitive material from the region irradiated with ultraviolet rays or the like. Thus, the first diffraction grating is formed in at least the first subregion, and the second diffraction grating is formed in the second subregion. Next, a similar process is repeated. Thus, it is possible to produce a diffraction grating assembly having a predetermined diffraction grating in each subregion. Examples of photosensitive materials usable in the above process are positive photoresists and photopolymers which enable the desired pattern to be recorded as a relief pattern according to the irradiation dose of light and which can be decomposed or made soluble by irradiation with ultraviolet rays, for example.

Figure 15A:
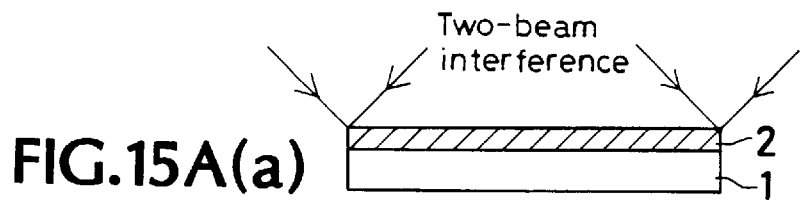
FIGS. 15A and 15B show the process sequence of one embodiment of the second producing method according to the present invention.
Figure 15A:
Figure 15A:
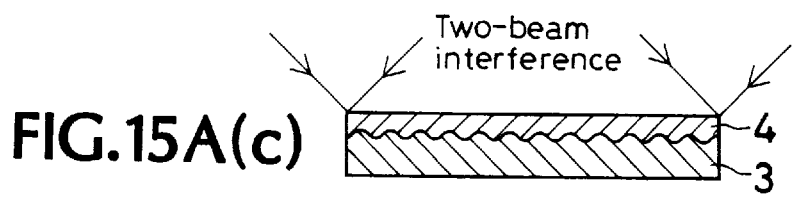
Figure 15A:
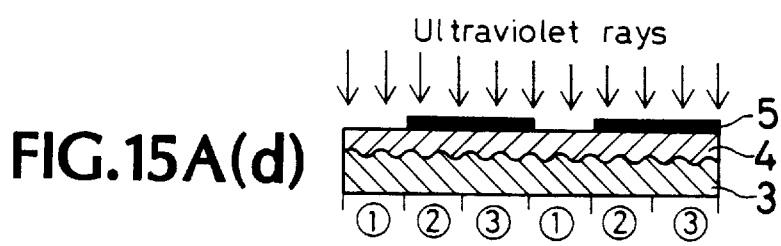
Figure 15A:
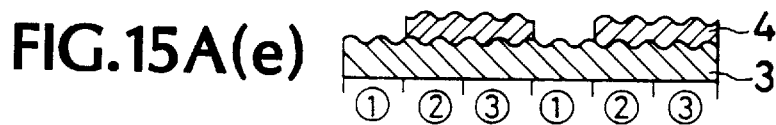
Figure 15A:
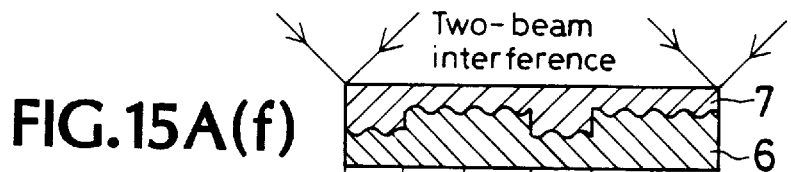
Figure 15A:
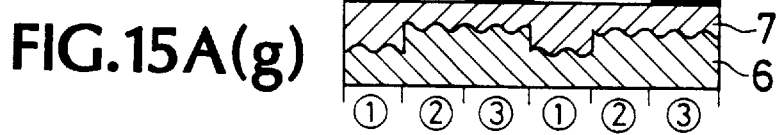
Figure 15B:
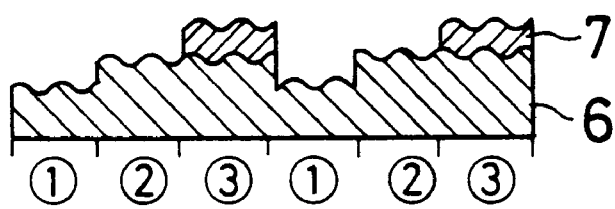
Figure 15B:
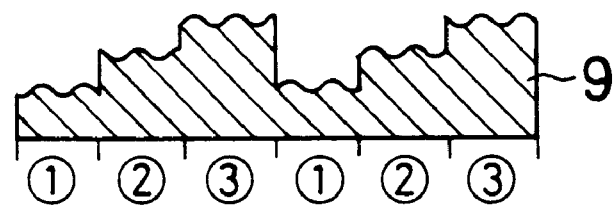
Figure 15B:
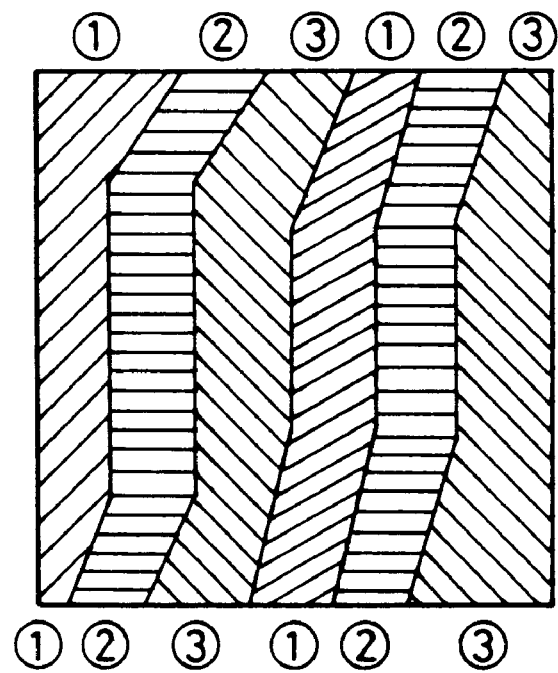

The above-described production process will be explained below more specifically with reference to FIGS. 15A and 15B. First, as shown in FIG. 15A(a), the surface of a substrate 1 is coated with a positive photoresist 2, for example, and the whole surface of the resist layer 2 is exposed to form, by two-beam interference, interference fringes corresponding in direction and pitch to those of the first diffraction grating to be formed in the first subregions ① of a diffraction grating assembly to be produced. Then, as shown in FIG. 15A(b), the exposed resist layer 2 is developed to produce the first diffraction grating. Next, the surface of the first diffraction grating is coated with an ultraviolet-curing resin, for example, and irradiated with ultraviolet rays, thereby producing a first duplicate 3 having the first diffraction grating transferred to the whole surface thereof, as shown in FIG. 15A(c). Then, the surface of the first duplicate 3 is coated with a photoresist 4 similar to the above, and the whole surface of the resist layer 4 is exposed to form, by two-beam interference, interference fringes corresponding in direction and pitch to those of the second diffraction grating to be formed in the second subregions ② of the diffraction grating assembly to be produced. Next, as shown in FIG. 15A(d), a first mask 5 is brought into close contact with the resist layer 4 having the second diffraction grating formed thereon by exposure so as to shield the regions other than the first regions ①. Next, ultraviolet rays are applied to the resist layer 4 to make the first regions ① of the resist layer 4 soluble in a developing solution, and then development is carried out, thereby obtaining a diffraction grating structure in which the first diffraction grating is exposed in the first regions ① and the second diffraction grating is formed in the other regions, as shown in FIG. 15A(e). The surface of the resulting structure is coated with an ultraviolet-curing resin, for example, and irradiated with ultraviolet rays, thereby producing a second duplicate 6 in which the first diffraction grating has been transferred to the first regions ① and the second diffraction grating has been transferred to the other regions, as shown in FIG. 15A(f). Next, the surface of the second duplicate 6 is coated with a photoresist 7 similar to the above, and the whole surface of the resist layer 7 is exposed to form, by two-beam interference, interference fringes corresponding in direction and pitch to those of the third diffraction grating to be formed in the third subregions ③ of the diffraction grating assembly to be produced. Next, as shown in FIG. 15A(g), a second mask 8 is brought into close contact with the resist layer 7 having the third diffraction grating formed thereon by exposure so as to shield the regions other than the first and second regions ① and ②. Next, ultraviolet rays are applied to the resist layer 7 to make the first and second regions ① and ② of the resist layer 7 soluble in a developing solution, and then development is carried out, thereby obtaining a diffraction grating structure in which the first and second diffraction gratings are exposed in the first and second regions ① and ②, respectively, and the third diffraction grating is formed in the other regions, as shown in FIG. 15B(h). The surface of the resulting structure is similarly coated with an ultraviolet-curing resin, and irradiated with ultraviolet rays, thereby producing a third duplicate 9 in which the first diffraction grating has been transferred to the first regions ①, the second diffraction grating has been transferred to the second regions ②, and the third diffraction grating has been transferred to the other regions ③, as shown in FIG. 15B(i). In this case, the diffraction grating assembly comprises only the first to third diffraction gratings. Thus, a diffraction grating assembly or a master plate used to duplicate it, which has a grating layout such as that shown in FIG. 15B(j), is obtained. A diffraction grating assembly comprising four or more diffraction gratings can also be produced by repeating a similar process to the above.

Although in the process shown in FIGS. 15A and 15B the first mask 5 shown in FIG. 15A(d) shields all the regions other than the first regions ①, it may be patterned to shield only the second regions ②. In such a case, in the duplicate 9 shown in FIG. 15B(i) the height of the third diffraction grating in the third regions ③ is the same as that of the second diffraction grating in the second regions ②, and the first diffraction grating in the first regions ① alone is lower than the others. The above-described two forms may be mixed together. Further, although in the process shown in FIGS. 15A and 15B each duplicating process is considered to be making of an exact copy, that is, repeating duplicating process twice, it may be a single duplicating process whereby the dimple pattern is reversed. In such a case, it is necessary to reverse odd- or even-numbered masks when used.

Although the foregoing description has been made on the assumption that the diffraction grating assembly constitutes a display medium such as that shown in FIGS. 4, 5, 8 and 12, the above-described production method may also be applied to a display medium comprising minute dots which are made of diffraction gratings, respectively, and arranged two-dimensionally, as disclosed in Japanese Patent Application Laid-Open (KOKAI) No. 2-72320, and to a machine-readable information recording medium comprising a plurality of diffraction gratings different in direction or pitch from each other which are arranged in side-by-side relation, as disclosed in Japanese Patent Application Laid-Open (KOKAI) No. 3-211096. Further, the above-described method can also be applied to production of various other diffraction grating assemblies.

It is a matter of course that the display medium of the present invention can also be produced by a lithographic process carried out using an electron beam lithography system, an ion beam lithography system, or a laser lithography system, as described above, in place of the optical interference exposure. In such a case, straight-line diffraction gratings which are different in pitch and direction from each other are successively drawn for each divided region, for example, by controlling the movement of an x-y-Θ stage supporting the substrate under the control of a computer.

Figure 16:
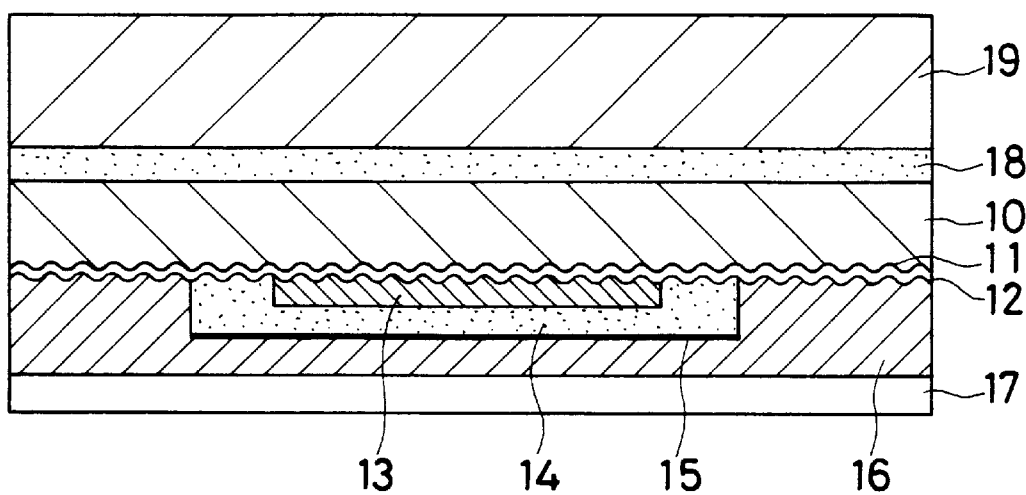
FIG. 16 is a sectional view of one example in which the display medium of the present invention is formed as a transfer seal.

Finally, an example in which a display medium employing a diffraction grating according to the present invention is arranged in the form of a transfer seal is shown in the sectional view of FIG. 16. A relief die, which has in its center a motional display pattern comprising a group of relief type partial straight-line diffraction gratings formed by lithography, for example, and a relief hologram for displaying a three-dimensional image that is disposed around the display pattern, is embossed into a diffraction grating forming resin layer 10 to duplicate the relief pattern. The duplicate relief surface 11 is provided with a thin transparent reflecting layer 12 having a larger or smaller refractive index than that of the resin layer 10. A print layer 13 is disposed on a part of the reflecting layer 12, i.e., on an approximately central position in the illustrated example. If necessary, a white layer 14 is deposited over a predetermined region including the print layer 13. An adhesive layer 15 is provided thereon. Then, a reflecting layer 16 of a metallic material, e.g., aluminum, is deposited by evaporation on the whole surface, including the peripheral portion where none of the print, white and adhesive layers 13, 14 and 15 are provided. Thus, a display medium is completed. When the display medium having the above-described arrangement is viewed from the resin layer (10) side, the motional display pattern comprising the diffraction gratings according to the present invention or a reconstructed three-dimensional image of the hologram can be seen at the central portion, which is covered by only the transparent reflecting layer 12 but not directly covered by the reflecting layer 16, being superimposed on the print pattern of the print layer 13 or the pattern of the white layer 14 on the reverse side by the Fresnel reflection at the transparent reflecting layer 12. At the peripheral portion that is directly covered by the reflecting layer 16 through the transparent reflecting layer 12, on the other hand, only the motional display pattern comprising the diffraction gratings or the reconstructed three-dimensional image of the hologram can be seen by reflection at the relief surface 11 of the resin layer 10 and reflection at the reflecting layer 12.

It should be noted that in the arrangement shown in FIG. 16 an adhesive or tackifier layer 17 is provided on the reflecting layer 16, and on the reverse side a release paper 19 is provided on the resin layer 10 through a release layer 18. Therefore, the display medium can be transferred to an object by bonding the former to the latter by the action of the adhesive or tackifier layer 17 and then peeling the release paper 19 on the reverse side.

Although the display medium employing a diffraction grating according to the present invention and the method of producing the same have been described above by way of some embodiments, it should be noted that the present invention is not necessarily limited to the described embodiments and that various changes and modifications may be imparted thereto. For example, it is possible to form a pattern in which a bright portion looks as if it sprang out from one point and were sucked thereinto, or a pattern which rotates. Although the foregoing description has been made on the assumption that the diffraction grating is a reflecting diffraction grating, the display medium can also be formed by using other types of diffraction grating, for example, a transmission diffraction grating or a semitransparent diffraction grating. Further, the display medium is not necessarily limited to those shown in FIGS. 5 and 12. The producing method by interference exposure according to the present invention can be applied to any type of display medium in which a display pattern is divided into subregions, and these subregions are assigned straight-line diffraction gratings having configurations matching the respective subregions.

As will be clear from the foregoing description, according to the display medium of the present invention, a display pattern, e.g., a character, an image, etc., is defined and displayed by the outer or inner contour of a diffraction grating composed of a group of smooth curves, or a diffraction grating composed of a group of partial straight-line diffraction gratings that form polygonal lines linearly approximating smooth curves. Accordingly, as the visual point is moved relative to the display medium, a position that looks bright by diffraction moves smoothly and variously. If the display medium is illuminated by white light, the region that looks bright becomes a rainbow-colored region. Accordingly, the display pattern becomes not only readily recognizable but also interesting to view. Thus, display and design effects become extremely excellent. By varying the configuration of curves, the motion of the region that looks bright can be changed variously.

According to the first method of producing a diffraction grating assembly according to the present invention, a plurality of masks having openings corresponding to the respective contours of the divided regions are employed, and exposure is successively carried out with the masks successively changed to form straight-line interference fringes by two-beam interference on portions of a photosensitive material corresponding to the respective openings of the masks so that each pair of adjacent portions are different from each other in at least fringe slope or fringe pitch, thereby forming an overall display pattern. Accordingly, a diffraction grating display medium, which has a relatively wide area and which enables the display pattern to move in various ways as the visual point moves, can readily be produced by optical process.

According to the second method of producing a diffraction grating assembly according to the present invention, a diffraction grating assembly having a predetermined diffraction grating formed in each subregion is produced by repeating the following steps: coating of a photosensitive material; formation of two-beam interference fringes on the whole surface of the photosensitive material coating by exposure; duplicating; coating of a photosensitive material; formation of two-beam interference fringes on the whole surface of the photosensitive material coating by exposure; and irradiation with light to expose the diffraction grating underlying a predetermined portion of the photosensitive material. Accordingly, even if there is a failure in photographing for a subregion, the processes which have already been carried out so far are not wasted. Even if there is a positioning error, the finished product is free from such a defect that a region where no grating is present or two gratings overlap each other is undesirably produced between partial diffraction gratings of the diffraction grating assembly. Thus, it is possible to readily produce a high-quality diffraction grating assembly which may be used, for example, to form the above-described display medium.

What we claim is:

1. A multiple display medium including a plurality of display patterns each composed of a diffraction grating assembly, each display pattern being divided into fine mesh pixels disposed at predetermined intervals, said mesh pixels corresponding at predetermined intervals at least one-dimensionally to a single display pattern such that said display medium is filled with the mesh pixels of all the display patterns without excess nor deficiency, with the original relative positions of said pixels being maintained, wherein in an oblique-line portion or a detail portion of any one of said display patterns, a mesh pixel which touches a contour line of said oblique-line portion or detail portion and which originally corresponded with another of said display patterns is changed to a pixel of said one display pattern when said mesh pixel has an area ratio of at least 50% to display said one display pattern.

2. A multiple display medium according to claim 1, wherein said divided pixels are not smaller than 30 $\mu$m in size.

3. A multiple display medium according to claim 1, wherein any one of mesh pixels which are adjacent to said mesh pixel changed from a non-corresponding pixel to a corresponding pixel and which should originally have corresponded to said one display pattern is changed to a pixel not corresponding to said one display pattern.

4. A method of producing a diffraction grating assembly including at least two diffraction gratings different from each other in direction or pitch, which are disposed in side-by-side relation to each other, said method comprising the steps of:

(a) coating a photosensitive material on a substrate;

(b) exposing the whole surface of said photosensitive material coating to form two-beam interference fringes corresponding in direction and pitch to those in an nth subregion, wherein n=1, thereby producing an nth diffraction grating;

(c) duplicating said nth diffraction grating;

(d) coating a photosensitive material on the resulting duplicate as a new substrate;

(e) exposing the whole surface of said photosensitive material coating to form two-beam interference fringes corresponding in direction and pitch to those in an (n+i)th subregion, thereby producing an (n+i)th diffraction grating;

(f) applying light to a region including at least the nth subregion, exclusive of any other subregion;

(g) carrying out development to separate or remove the photosensitive material from the irradiated region, thereby producing a diffraction grating structure having the nth diffraction grating formed in at least the nth subregion and the (n+i)th diffraction grating formed in the (n+i)th subregion;

(h) duplicating said diffraction grating structure; and repeating at least steps (d), (e), (f), and (g) for at least i=1 and 2, thereby producing a diffraction grating assembly having a predetermined diffraction grating formed in each subregion.

5. A method of producing a diffraction grating assembly according to claim 4, wherein said photosensitive material enables a desired pattern to be recorded as a relief pattern according to irradiation dose of light and can be decomposed or made soluble by irradiation with ultraviolet rays, electron beams, ion beams or laser.

6. A method of producing a diffraction grating assembly according to claim 5, wherein the diffraction gratings in the subregions of said diffraction grating assembly are arranged such that each pair of adjacent subregions have therebetween a gradual and smooth change in grating slope and a smooth or substantially no change in grating pitch and that when grating lines or straight lines parallel to them are connected together between a pair of adjacent subregions, the connected lines form polygonal lines linearly approximating smooth curves, and wherein each subregion defines and displays a display pattern by an outer or inner contour thereof.

7. A method of producing a diffraction grating assembly according to claim 4, wherein the diffraction gratings in the subregions of said diffraction grating assembly are arranged such that each pair of adjacent subregions have therebetween a gradual and smooth change in grating slope and a smooth or substantially no change in grating pitch and that when grating lines or straight lines parallel to them are connected together between a pair of adjacent subregions, the connected lines form polygonal lines linearly approximating smooth curves, and wherein each subregion defines and displays a display pattern by an outer or inner contour thereof.

8. A method of display image multiplexing comprising dividing a plurality of display patterns of a multiple display medium into fine mesh pixels disposed at predetermined intervals, selecting said mesh pixels at predetermined intervals at least one-dimensionally to form a single display pattern such that said multiple display medium is filled with the selected mesh pixels of all the display patterns without excess nor deficiency, with the original relative positions of said pixels being maintained, and in an oblique-line portion or a detail portion of any one of said display pattern, selecting and combining together mesh pixels according to a rule different from that for the other portion, wherein each of said mesh pixels comprises a diffraction grating.

9. A method of displaying images in a multiple display medium including a plurality of display patterns each composed of a diffraction grating assembly, comprising the steps of:

dividing each display pattern into fine mesh pixels disposed at predetermined intervals;

selecting said mesh pixels at predetermined intervals either two- or one-dimensionally to form a single display pattern such that it is filled with the selected mesh pixels of all the display patterns without excess nor deficiency, with the original relative positions of said pixels being maintained, wherein at least one display pattern comprises either a diffraction grating assembly composed of a group of smooth curves or a diffraction grating assembly composed of a group of partial straight-line diffraction gratings, said partial straight-line diffraction gratings being arranged such that each pair of adjacent regions, each composed of a pixel or a plurality of pixels, have therebetween a gradual and smooth change in grating slope and a smooth or substantially no change in grating pitch and that when grating lines or straight lines parallel to them are connected together between a pair of adjacent partial straight-line diffraction gratings, the connected lines form polygonal lines linearly approximating smooth curves, and combining together mesh pixels to form an oblique-line portion or a detail portion of any one of said display patterns, wherein said mesh pixels are selected and combined together according to a rule different from that for the other portion.

* * * * *